(12) United States Patent
Fu et al.

(10) Patent No.: US 11,313,676 B2
(45) Date of Patent: Apr. 26, 2022

(54) THREE-DIMENSIONAL MEASUREMENT APPARATUS, THREE-DIMENSIONAL MEASUREMENT METHOD, AND THREE-DIMENSIONAL MEASUREMENT NON-TRANSITORY COMPUTER READABLE MEDIUM

(71) Applicant: OMRON Corporation, Kyoto (JP)

(72) Inventors: Xingdou Fu, Kizugawa (JP); Takashi Shimizu, Hikone (JP)

(73) Assignee: OMRON Corporation, Kyoto (JP)

( * ) Notice: Subject to any disclaimer, the term of this patent is extended or adjusted under 35 U.S.C. 154(b) by 43 days.

(21) Appl. No.: 16/963,247

(22) PCT Filed: Jan. 31, 2019

(86) PCT No.: PCT/JP2019/003333
§ 371 (c)(1),
(2) Date: Jul. 19, 2020

(87) PCT Pub. No.: WO2019/155974
PCT Pub. Date: Aug. 15, 2019

(65) Prior Publication Data
US 2021/0356259 A1    Nov. 18, 2021

(30) Foreign Application Priority Data
Feb. 7, 2018    (JP) .............................. JP2018-019998

(51) Int. Cl.
*G01B 11/25*    (2006.01)
*H04N 5/235*    (2006.01)
(52) U.S. Cl.
CPC ........ *G01B 11/254* (2013.01); *G01B 11/2513* (2013.01); *H04N 5/2353* (2013.01)

(58) Field of Classification Search
CPC ..... G01B 11/25; G01B 11/2513; G01B 11/24; G01B 11/2545; G01B 11/2536;
(Continued)

(56) References Cited

U.S. PATENT DOCUMENTS

2014/0064603 A1\* 3/2014 Zhang ................ G01B 11/2513
382/154
2014/0132722 A1    5/2014 Martinez Bauza et al.
2016/0373628 A1\* 12/2016 Nakajima ................ H04N 5/58

FOREIGN PATENT DOCUMENTS

CN      105651203 A    \*  6/2016
CN      106454149       2/2017
(Continued)

OTHER PUBLICATIONS

Muhammad Atif et al., "Auto-Setting of Optimal Exposure for Structured Light 3D Cameras," Ubiquitous Information Management and Communication, Jan. 2018, pp. 1-6.
(Continued)

*Primary Examiner* — Michael P Stafira
(74) *Attorney, Agent, or Firm* — JCIPRNET

(57) ABSTRACT

The three-dimensional measurement apparatus includes a projecting unit configured to project patterned light onto a measurement target and an image capturing unit configured to capture an image of the measurement target onto which the patterned light is projected, with a predetermined exposure time, a calculation unit configured to calculate positions of a three-dimensional point group expressing a three-dimensional shape of the measurement target based on the feature points included in the image, and a determination unit configured to determine the exposure time such that at least one of the number of feature points and the number of three-dimensional point groups is equal to or greater than a threshold that is defined based on one of their maximum (Continued)

numbers, and the exposure time is shorter than an exposure time for the maximum number.

10 Claims, 9 Drawing Sheets

(58) Field of Classification Search
CPC ............ G01B 11/2531; G01B 11/2527; G01B 11/254; G01B 11/002; G01B 11/161; G01B 11/007; G01B 11/026; G01B 11/2518; G01B 11/2441; G01B 2210/52; G01B 11/2416; G01B 11/2509; G01B 11/2522; G01B 9/04; G01B 11/02; G01B 11/245; G01B 11/30; G01B 9/02068; G01B 21/042; G01B 11/2433; G01B 11/2504; G01B 11/27; G01B 11/0608; G01B 11/26; G01B 11/005; G01B 11/303; G01B 2210/58; G01B 11/28; G01B 9/02083; G01B 9/02094; G01B 11/06; G01B 9/02044; G01B 11/022; G01B 11/272; G01B 2290/70; G01B 5/0028; G01B 9/02019; G01B 9/02089; G01B 9/02098; G01B 11/028; G01B 11/275; G01B 21/04; G01B 2210/20; G01B 2210/26; G01B 2210/283; G01B 2290/20; G01B 9/02034; G01B 11/08; G01B 11/306; G01B 2210/50; G01B 2290/45; G01B 9/02017; G01B 9/0203; G01B 9/02041; G01B 5/25; G01B 9/0201; G01B 9/02072; G01B 9/021; G01B 11/0641; G01B 11/0683; G01B 11/164; G01B 11/2755; G01B 2210/14; G01B 2210/286; G01B 2210/56; G01B 5/0004; G01B 9/02; G01B 9/02028; G01B 11/0675; G01B 11/167; G01B 11/2425; G01B 5/0023; G01B 9/02004; G01B 9/02014; G01B 9/02029; G01B 9/02045; G01B 9/02047; G01B 9/02077; G01B 9/02085; G01B 9/027
See application file for complete search history.

(56) References Cited

FOREIGN PATENT DOCUMENTS

| | | | | |
|---|---|---|---|---|
| CN | 104270575 | | 12/2017 | |
| JP | 2006275555 | | 10/2006 | |
| JP | 2009168658 | | 7/2009 | |
| JP | 2016134723 | | 7/2016 | |
| JP | 2017527137 A | * | 9/2017 | |
| JP | 2018004278 A | * | 1/2018 | ......... G01B 11/2513 |
| JP | 2018017653 | | 2/2018 | |
| WO | WO-2007116744 A1 | * | 10/2007 | ............ G06T 7/521 |
| WO | WO-2013035847 A1 | * | 3/2013 | ......... G01B 11/2513 |
| WO | 2015023483 | | 2/2015 | |
| WO | WO-2016113861 A1 | * | 7/2016 | ............ G01B 11/25 |

OTHER PUBLICATIONS

"Search Report of Europe Counterpart Application", dated Sep. 27, 2021, p. 1-p. 8.
Office Action of China Counterpart Application, with English translation thereof, dated May 21, 2021, pp. 1-12.
"International Search Report (Form PCT/ISA/210) of PCT/JP2019/003333," dated Feb. 26, 2019, with English translation thereof, pp. 1-4.
"Written Opinion of the International Searching Authority (Form PCT/ISA/237) of PCT/JP2019/003333," dated Feb. 26, 2019, with English translation thereof, pp. 1-6.

* cited by examiner

THREE-DIMENSIONAL MEASUREMENT APPARATUS, THREE-DIMENSIONAL MEASUREMENT METHOD, AND THREE-DIMENSIONAL MEASUREMENT NON-TRANSITORY COMPUTER READABLE MEDIUM

CROSS-REFERENCE TO RELATED APPLICATION

This application is a 371 application of the International PCT application serial no. PCT/JP2019/003333, filed on Jan. 31, 2019, which claims the priority benefits of Japan Patent Application No. 2018-019998, filed on Feb. 7, 2018. The entirety of each of the above-mentioned patent applications is hereby incorporated by reference herein and made a part of this specification.

FIELD

The present disclosure relates to a three-dimensional measurement apparatus, a three-dimensional measurement method, and a three-dimensional measurement program.

BACKGROUND

Conventionally, three-dimensional measurement apparatuses have been used which are configured to capture an image of a measurement target in a state in which patterned light is projected onto it and calculate positions of a three-dimensional point group expressing a three-dimensional shape of the measurement target from the position of the pattern on the image using the principle of triangulation.

Patent Literature 1 below discloses an image capturing apparatus configured to generate parallax information based on a plurality of images captured by a plurality of image capturing units and determine an amount of exposure that is used by the plurality of image capturing units during the subsequent image capturing such that the number of parallax values included in a parallax value group of an image portion onto which a target in the captured region is projected increases. Herein, the image capturing apparatus acquires parallax information that is generated from the images captured using a plurality of amounts of exposure and corresponds to each of the amounts of exposure, specifies the amount of exposure that corresponds to parallax information with the highest number of parallax values in the acquired pieces of parallax information, and determines the amount of exposure that is to be used by the plurality of image capturing units during the subsequent image capturing.

CITATION LIST

Patent Literature

Patent Literature 1: Japanese Patent Laid-Open No. 2016-134723

SUMMARY

Problems to be Solved

FIG. 4 in Patent Literature 1 shows that a parallax score is at its maximum at a given exposure time where the vertical axis indicates the parallax score and the horizontal axis indicates the exposure time. The image capturing apparatus disclosed in Patent Literature 1 measures a three-dimensional shape of a measurement target based on parallax information of the plurality of image capturing units, and determines the amount of exposure that is used by the plurality of image capturing units so as to maximize the number of parallax values. Thus, if the aperture of an image capturing unit is kept constant, the exposure time in which the image capturing unit captures a target is determined to be relatively long such that the number of parallax values is maximized.

According to the image capturing apparatus disclosed in Patent Literature 1, it is possible to determine the exposure time of the image capturing unit such that the number of three-dimensional point groups that is to be calculated is maximized. However, the inventors of the invention found that when the exposure time and the number of three-dimensional point groups to be calculated are actually examined, the vertical axis indicates the number of three-dimensional point groups to be calculated, and the horizontal axis indicates the exposure time, for example, as in "phase 2" in FIG. 8, a section sometimes arises in which the number of three-dimensional point groups to be calculated hardly changes with respect to a change in the exposure time. In such a case, with the image capturing apparatus disclosed in Patent Literature 1, the exposure time of the image capturing units is sometimes adjusted to be unnecessarily long, and if three-dimensional shapes of a plurality of measurement targets are measured successively, such as measuring three-dimensional shapes of a plurality of measurement targets that move on a manufacturing line, for example, with the image capturing apparatus disclosed in Patent Literature 1, a time interval in which the three-dimensional shapes can be measured is sometimes limited.

In view of this, the present invention provides a three-dimensional measurement apparatus, a three-dimensional measurement method, and a three-dimensional measurement program with which the exposure time of an image capturing unit can be shortened and the time period that is required to measure a three-dimensional shape of a measurement target can be shortened.

Means to Solve Problems

A three-dimensional measurement apparatus according to one aspect of the present disclosure includes a projecting unit configured to project patterned light onto a measurement target, an image capturing unit configured to capture an image of the measurement target onto which the patterned light is projected, with a predetermined exposure time, a calculation unit configured to extract a plurality of feature points included in the image and to calculate positions of a three-dimensional point group expressing (representing) a three-dimensional shape of the measurement target based on the plurality of feature points, and a determination unit configured to determine the exposure time such that at least one of the number of feature points and the number of points included in the three-dimensional point group is equal to or greater than a threshold number that is defined based on either the maximum number of feature points or the maximum number of points included in the three-dimensional point group, and the exposure time is shorter than an exposure time for the maximum number (an exposure time with which the maximum number of feature points can be extracted or the maximum number of points included in the three-dimensional point group can be calculated). Herein, "patterned light" is light including a random dot pattern or a coded pattern, may also be visible light, or invisible light such as infrared rays. Also, "exposure time" refers to a time period in which light is applied to an image sensor of the image capturing unit.

According to this aspect, by determining the exposure time such that at least one of the number of feature points and the number of points included in the three-dimensional point group is equal to or greater than the threshold and the exposure time is shorter than an exposure time for either the maximum number of feature points or the maximum number of points included in the three-dimensional point group, it is possible to attain the advantage of a decrease in the exposure time, which is larger than the disadvantage of a decrease in the number of points included in the three-dimensional point group, to capture the measurement target in an exposure time that is shorter than the exposure time for maximizing the number of points included in the three-dimensional point group, to shorten the exposure time of the image capturing unit, and to shorten a time period required to measure the three-dimensional shape of the measurement target.

In the above-described aspect, the image capturing unit may also be configured to capture a plurality of images while changing the exposure time, and the apparatus may further include an estimation unit configured to estimate, based on the plurality of images, how at least one of the number of feature points and the number of points included in the three-dimensional point group changes depending on the exposure time, and the determination unit may be configured to determine the exposure time based on an estimation result made by the estimation unit.

According to this aspect, by estimating how at least one of the number of feature points and the number of points included in the three-dimensional point group changes depending on the exposure time, it is possible to estimate, from a relatively small number of images, an exposure time with which at least one of the number of feature points and the number of points included in the three-dimensional point group is equal to or greater than the threshold, and to shorten a time period required for processing for determining the exposure time.

In the above-described aspect, the estimation result may also include a first stage in which the number of feature points and the number of points included in the three-dimensional point group increase as the exposure time extends, and a second stage that is adjacent to the first stage and in which the number of feature points and the number of points included in the three-dimensional point group change more gently than in the first stage as the exposure time extends, and at least one of the number of feature points and the number of three-dimensional point groups is equal to or greater than the threshold, and the determination unit may also be configured to determine the exposure time based on a boundary between the first stage and the second stage.

According to this aspect, by determining the exposure time based on the boundary between the first stage and the second stage, it is possible to minimize the exposure time with which at least one of the number of feature points and the number of points included in the three-dimensional point group is equal to or greater than the threshold, to shorten the exposure time of the image capturing unit, and measure the three-dimensional shape of the measurement target.

In the above-described aspect, the estimation result may also further include a third stage that is adjacent to the second stage and in which the number of feature points and the number of points included in the three-dimensional point group decrease as the exposure time extends, and an absolute value of an amount of a change in the number of feature points and an absolute value of an amount of a change in the number of points included in the three-dimensional point group when the exposure time is changed by a predetermined amount may also be smaller in the second stage than in the third stage.

According to this aspect, because the absolute value of the change in the number of feature points and the absolute value of the change in the number of points included in the three-dimensional point group are smaller than in the second stage or in the third stage if the exposure time is changed by a predetermined amount, even if the exposure time is changed in the second stage, a change in the number of feature points and a change in the number of points included in the three-dimensional point group are relatively small. Thus, it is possible to set a threshold such that a difference between the threshold and either the maximum number of feature points or the maximum number of points included in the three-dimensional point group is relatively small, and to further shorten the exposure time while sufficiently increasing the number of feature points and the number of points included in the three-dimensional point group.

In the above-described aspect, the estimation unit may also be configured to estimate relationships between the exposure time in the first stage and the exposure time in the second stage, the number of feature points, and the number of points included in the three-dimensional point group, using a function including one or more parameters.

According to this aspect, by estimating one or more parameters, it is possible to accurately estimate how the number of feature points and the number of points included in the three-dimensional point group change depending on the exposure time, to reduce a calculation load of processing for determining the exposure time, and to shorten a time period required for the processing.

In the above-described aspect, when the exposure time is t and one or more parameters are $N_o$ and $\tau$, the estimation unit may also be configured to estimate relationships between the exposure time in the first stage and the exposure time in the second stage, the number of feature points, and the number of points included in the three-dimensional point group, using the function $N(t)=N_o(1-\exp(-t/\tau))$.

According to this aspect, by presuming the function $N(t)=N_o(1-\exp(-t/\tau))$ and estimating the two parameters $N_o$ and $\tau$, it is possible to accurately estimate a nonlinear relationship between the exposure time, the number of feature points, and the number of points included in the three-dimensional point group, to reduce a calculation load of processing for determining the exposure time, and to shorten a time period required for the processing.

In the above-described aspect, when the threshold is expressed by A and is greater than zero and not more than one, the determination unit may also determine the exposure time t by $t=\tau \ln(1/(1-A))$.

According to this aspect, by estimating the parameter $\tau$, it is possible to calculate the exposure time with which at least one of the number of feature points and the number of points included in the three-dimensional point group coincides with the threshold, to reduce the calculation load of processing for determining the exposure time, and to shorten a time period required for the processing.

In the above-described aspect, the determination unit may also be configured to determine the exposure time or a light amount of the projecting unit such that at least one of the number of feature points and the number of points included in the three-dimensional point group is equal to or greater than the threshold, and the exposure time is shorter than an exposure time for the maximum number.

According to this aspect, by determining the exposure time or the light amount of the projecting unit such that at least one of the number of feature points and the number of points included in the three-dimensional point group is equal to or greater than the threshold and the exposure time is shorter than an exposure time for either the maximum number of feature points or the maximum number of points included in the three-dimensional point group, it is possible to attain the advantage of a decrease in the exposure time or the light amount of the projecting unit, which is larger than the disadvantage of a decrease in the number of points included in the three-dimensional point group, to capture the measurement target with a light amount that is smaller than a light amount for maximizing the number of points included in the three-dimensional point group, to reduce power consumed by the projecting unit, and to measure the three-dimensional shape of the measurement target.

A three-dimensional measurement method according to another aspect of the present disclosure includes projecting patterned light onto a measurement target, capturing an image of the measurement target onto which the patterned light is projected, with a predetermined exposure time, extracting a plurality of feature points included in the image and calculating positions of a three-dimensional point group expressing a three-dimensional shape of the measurement target based on the plurality of feature points, and determining the exposure time such that at least one of the number of feature points and the number of points included in the three-dimensional point group is equal to or greater than a threshold that is defined based on either the maximum number of feature points or the maximum number of points included in the three-dimensional point group, and the exposure time is shorter than an exposure time for the maximum number.

According to this aspect, by determining the exposure time such that at least one of the number of feature points and the number of points included in the three-dimensional point group is equal to or greater than the threshold and the exposure time is shorter than an exposure time for either the maximum number of feature points or the maximum number of points included in the three-dimensional point group, it is possible to attain the advantage of a decrease in the exposure time, which is larger than the disadvantage of a decrease in the number of points included in the three-dimensional point group, to capture the measurement target with an exposure time that is shorter than the exposure time for maximizing the number of points included in the three-dimensional point group, to shorten the exposure time of the image capturing unit, and to shorten a time period required to measure the three-dimensional shape of the measurement target.

A three-dimensional measurement program according to another aspect of the present disclosure causes an arithmetic unit provided in a three-dimensional measurement apparatus that includes a projecting unit configured to project patterned light onto a measurement target and an image capturing unit configured to capture an image of the measurement target onto which the patterned light is projected, with a predetermined exposure time, to operate as a calculation unit configured to extract a plurality of feature points included in the image and to calculate positions of a three-dimensional point group expressing a three-dimensional shape of the measurement target based on the plurality of feature points, and a determination unit configured to determine the exposure time such that at least one of the number of feature points and the number of points included in the three-dimensional point group is equal to or greater than a threshold that is defined based on either the maximum number of feature points or the maximum number of points included in the three-dimensional point group, and the exposure time is shorter than an exposure time for the maximum number.

According to this aspect, by determining the exposure time such that at least one of the number of feature points and the number of points included in the three-dimensional point group is equal to or greater than the threshold and the exposure time is shorter than an exposure time for either the maximum number of feature points or the maximum number of points included in the three-dimensional point group, it is possible to attain the advantage of a decrease in the exposure time, which is larger than the disadvantage of a decrease in the number of points included in the three-dimensional point group, to capture the measurement target with an exposure time that is shorter than the exposure time for maximizing the number of points included in the three-dimensional point group, to shorten the exposure time of the image capturing unit, and to shorten a time period required to measure the three-dimensional shape of the measurement target.

Effect

Provided are a three-dimensional measurement apparatus, a three-dimensional measurement method, and a three-dimensional measurement program with which the exposure time of an image capturing unit can be shortened and the time period that is required to measure a three-dimensional shape of a measurement target can be shortened.

DETAILED DESCRIPTION

Figure 1:
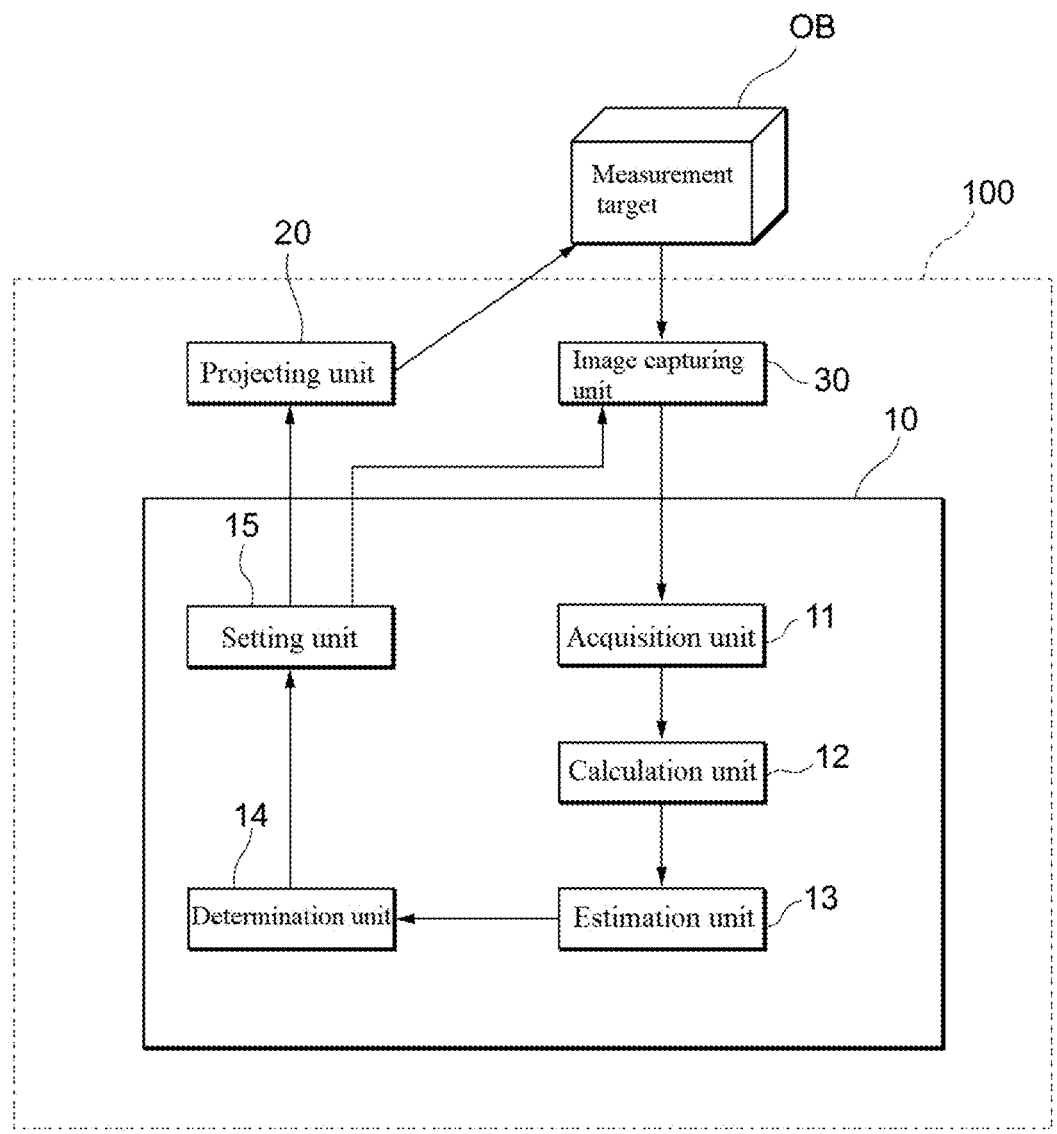
FIG. 1 is a functional block diagram of a three-dimensional measurement apparatus according to an embodiment of the present invention.

Hereinafter, an embodiment (hereinafter, referred to as "the present embodiment") according to one aspect of the present invention will be described with reference to the drawings. Note that constituent elements with the same reference numeral have the same or similar configuration in the drawings.

§ 1 Application Example

First, an example of a scenario to which the present invention is applied will be described with reference to FIG. 1. A three-dimensional measurement apparatus 100 according to the present embodiment includes a projecting unit 20 configured to project patterned light onto a measurement target (object to be measured) OB, an image capturing unit 30 configured to capture an image of the measurement target OB onto which the patterned light is projected, with a predetermined exposure time, and an arithmetic unit 10. Herein, "patterned light" is light including a random dot pattern or a coded pattern, may also be visible light, or invisible light such as infrared rays. Also, the "exposure time" refers to a time period in which light is applied to an image sensor of the image capturing unit 30. The exposure time may be several tens to several hundreds ms (milliseconds), for example. The image capturing unit 30 captures the image of the measurement target OB onto which the patterned light is projected, the arithmetic unit 10 analyzes the image captured by the image capturing unit 30, extracts a plurality of feature points included in the image, and calculates positions of a three-dimensional point group expressing a three-dimensional shape of the measurement target OB using the principle of triangulation based on the positions of the plurality of feature points. Note that a time period required to measure the three-dimensional shape of the measurement target is the sum of a time period required for the image capturing unit 30 to capture the measurement target, a time period required to transmit the captured image, and a time period required to calculate the positions of the three-dimensional point group expressing the three-dimensional shape of the measurement target based on the captured image.

A three-dimensional measurement apparatus 100 determines, using the arithmetic unit 10, the exposure time of the image capturing unit 30 such that at least one of the number of feature points and the number of points included in the three-dimensional point group is equal to or greater than a certain threshold number. Herein, the threshold is a value that can be set as appropriate, and may be 95% of the maximum $N_{max}$ of the number of points included in the three-dimensional point group, that is, $0.95 N_{max}$, 99% of the maximum $N_{max}$ of the number of points included in the three-dimensional point group, that is, $0.99 N_{max}$, 95% of the maximum $n_{max}$ of the number of feature points, that is, $0.95 n_{max}$, or 99% of the maximum $n_{max}$ of the number of feature points, that is, $0.99 n_{max}$, for example. Also, the threshold may be a value obtained by subtracting a predetermined value C from the maximum $N_{max}$ of the number of points included in the three-dimensional point group, that is, ($N_{max}$–C), or a value obtained by subtracting a predetermined value C from the maximum $n_{max}$ of the number of feature points, that is, ($n_{max}$–C). Also, the threshold may be expressed by a ratio with respect to the maximum $n_{max}$ of the number of feature points or the maximum $N_{max}$ of the number of points included in the three-dimensional point group, such as 0.95 or 0.99. Note that even if the threshold is defined based on the maximum number of feature points, at least one of the number of feature points and the number of points included in the three-dimensional point group should be equal to or greater than the threshold. Also, even if the threshold is defined based on the maximum number of points included in the three-dimensional point group, at least one of the number of feature points and the number of points included in the three-dimensional point group should be at least the threshold. If the threshold is defined based on the maximum number of feature points or the maximum number of points included in the three-dimensional point group, both of the number of feature points and the number of points included in the three-dimensional point group may also be equal to or greater than the threshold.

The number of feature points that can be extracted by the arithmetic unit 10 and the number of points included in the three-dimensional point group that can be calculated by the arithmetic unit 10 are at their maximum when the projecting unit 20 projects patterned light onto the measurement target OB with an appropriate amount of light and the image capturing unit 30 captures the measurement target OB for an appropriate exposure time. Herein, if the light amount of the patterned light projected by the projecting unit 20 is reduced or the exposure time of the image capturing unit 30 is shortened, the brightness of the image decreases, it becomes difficult to detect the patterned light, and the number of feature points that can be extracted and the number of points included in the three-dimensional point group that can be calculated decrease. Thus, conventionally, the light amount of the patterned light projected by the projecting unit 20 and the exposure time of the image capturing unit 30 were sometimes optimized such that the number of feature points that can be extracted and the number of points included in the three-dimensional point group that can be calculated were at their maximum. However, the inventors found that when the exposure time of the image capturing unit 30 is gradually shortened from an optimum value, the number of feature points that are extracted and the number of points included in the three-dimensional point group that is calculated changes hardly at all.

In view of this, with the three-dimensional measurement apparatus 100 according to the present embodiment, the exposure time is determined such that at least one of the number of feature points that can be (that are) extracted and the number of points included in the three-dimensional point group that can be (that are) calculated is at least a threshold number that is defined based on either the maximum number of feature points or the maximum number of points included in the three-dimensional point group, and such that the exposure time is shorter than an exposure time for either the maximum number of feature points that can be extracted or the maximum number of points included in the three-dimensional point group that can be calculated (i.e. an exposure time for extracting the maximum number of feature points or calculating the maximum number of points included in the three-dimensional point group).

For example, when the threshold is set to 99% of the maximum $N_{max}$ of the number of points included in the three-dimensional point group that can be calculated, the three-dimensional measurement apparatus 100 may determine an exposure time of about $0.5 t_{max}$, i.e. a fraction of the exposure time $t_{max}$ with which the number of points included in the three-dimensional point group is at its maximum. The same applies to the case where a threshold is defined based on the maximum number of feature points that can be extracted. By determining an exposure time such that at least one of the number of feature points and the number of points included in the three-dimensional point group is at least the threshold and the exposure time is shorter than the exposure time for either the maximum number of feature points or the maximum number of points included in the three-dimensional point group, it is possible to attain the advantage of a decrease in the exposure time, which is larger than the disadvantage of a decrease in the number of points included in the three-dimensional point group, to capture the measurement target OB with an exposure time that is shorter than an exposure time with which the number of points included in the three-dimensional point group is at its maximum, to shorten the exposure time of the image capturing unit 30, and to shorten a time period required to measure the three-dimensional shape of the measurement target.

Accordingly, if the three-dimensional shape of the measurement target OB is successively measured, for example, if three-dimensional shapes of a plurality of measurement targets OB that are moving on the manufacturing line are measured, it is possible to shorten the time intervals in which the measurement can be made, to increase a line speed, and to increase the manufacturing efficiency. Also, even if the three-dimensional shape of measurement targets OB that move at relatively high speed is measured, the exposure time of the image capturing unit 30 is set to be relatively short, and thus, it is possible to capture an image of the measurement target OB with little blur, and to calculate positions of the three-dimensional point group expressing the three-dimensional shape of the measurement target OB.

§ 2 Configuration Example

Functional Configuration

Next, an example of a functional configuration of the three-dimensional measurement apparatus 100 according to the present embodiment will be described with reference to FIG. 1. The three-dimensional measurement apparatus 100 includes a projecting unit 20, an image capturing unit 30, and an arithmetic unit 10.

Configuration of Projecting Unit

The projecting unit 20 may be a projector configured to project visible or invisible light, and projects patterned light onto a measurement target OB. The projecting unit 20 may be disposed such that its position relative to the image capturing unit 30 is a predetermined position. Also, the projecting unit 20 may project patterned light onto the measurement target OB based on a command from the arithmetic unit 10. The projecting unit 20 may be capable of changing the light amount of the patterned light to be projected, or may also set the light amount based on a command from the arithmetic unit 10.

The projecting unit 20 may include a light source and a photomask for generating the patterned light, and may include a laser light source and a diffractive optical element, for example. Also, the projecting unit 20 may be a projector having an optical element configured to form a fixed pattern and a DLP (Digital Light Processing) as a light modulation element, for example, and may also include a modulation element configured to modulate a size of a pattern to be projected. The projecting unit 20 may allow light from the laser light source to enter the diffractive optical element, and generate light having a two-dimensional structure using a diffraction pattern formed on a surface of the diffractive optical element. Note that the projecting unit 20 may also include an optical member such as a lens, the wavelength of the light emitted from the light source is not limited to a visible region, and may also be a wavelength in an infrared region or an ultraviolet region.

Configuration of Image Capturing Unit

The image capturing unit 30 may be a camera in which one or more lenses collect light in a light-receiving element and the received light is converted into an electric signal by an image sensor such as a CCD (Charge-Coupled Device) sensor or a CMOS (Complementary Metal-Oxide-Semiconductor) sensor, and the image capturing unit 30 captures an image of the measurement target OB onto which patterned light is projected, with a predetermined exposure time. The image capturing unit 30 may set an exposure time based on a command from the arithmetic unit 10. Although with the three-dimensional measurement apparatus 100 according to the present embodiment, the exposure varies by changing the exposure time with a constant aperture of the image capturing unit 30, in general, the aperture of the image capturing unit 30 and the exposure time may be changed. Although the three-dimensional measurement apparatus 100 according to the present embodiment includes one image capturing unit 30, the number of image capturing units is selected freely, and the three-dimensional measurement apparatus 100 may also include a plurality of image capturing units.

If a predetermined condition is satisfied, the image capturing unit 30 may change the exposure time and capture a plurality of images of the measurement target OB. Herein, the predetermined condition may include at least one of a condition related to an operation time of the image capturing unit 30 and a condition related to a pause time of the image capturing unit 30. More specifically, if the operation time is at least a certain time period, in order to adjust the exposure time, the image capturing unit 30 may change the exposure time and capture a plurality of images of the measurement target OB. Herein, the "operation time" may be a cumulative time in which images are captured by the image capturing unit 30. Also, if the pause time is at least a certain time period, in order to adjust the exposure time, the image capturing unit 30 may change the exposure time, and capture a plurality of images of the measurement target OB. Herein, the "pause time" may be a cumulative time in which no image is captured by the image capturing unit 30.

By capturing a plurality of images while changing the exposure time if the predetermined condition is satisfied and determining the exposure time such that at least one of the number of feature points and the number of points included in the three-dimensional point group is at least the threshold, it is possible to omit processing for determining the exposure time if the predetermined condition is not satisfied, and to shorten a time period required to measure the three-dimensional shape of the measurement target OB.

Also, capturing a plurality of images while changing the exposure time if at least one of the operation time of the image capturing unit 30 and the pause time of the image capturing unit 30 satisfies a predetermined condition and determining the exposure time such that at least one of the number of feature points and the number of points included in the three-dimensional point group is at least the threshold, it is possible to omit processing for determining the exposure time if the predetermined condition is not satisfied, and to shorten a time period required to measure the three-dimensional shape of the measurement target OB.

Configuration of Arithmetic Unit

The arithmetic unit 10 has an acquisition unit 11, a calculation unit 12, an estimation unit 13, a determination unit 14, and a setting unit 15. The acquisition unit 11 acquires an image of the measurement target OB onto which patterned light is projected, the image being captured by the image capturing unit 30.

The calculation unit 12 extracts a plurality of feature points included in the image captured by the image capturing unit 30, and calculates positions of a three-dimensional point group expressing a three-dimensional shape of the measurement target OB based on the plurality of feature points. Herein, the "plurality of feature points" may be feature points included in the patterned light, and their positions on the image may change according to the shape of the measurement target OB. The calculation unit 12 may compare the positions of the feature points in the projected patterned light with the positions of the feature points on the captured image, and calculate the positions of the three-dimensional point group expressing the three-dimensional shape of the measurement target OB using the principle of triangulation.

Also, if the image capturing unit 30 captures a plurality of images of the measurement target OB while changing the exposure time, the calculation unit 12 may calculate the positions of the three-dimensional point group expressing the three-dimensional shape of the measurement target OB for each of the plurality of images.

The estimation unit 13 estimates how at least one of the number of feature points that can be extracted by the calculation unit 12 and the number of points included in the three-dimensional point group that can be calculated by the calculation unit 12 changes depending on the exposure time based on the plurality of images of the measurement target OB that were captured by the image capturing unit 30 with different exposure times. The content of specific processing performed by the estimation unit 13 will be described in detail with reference to the drawing below and the subsequent drawings.

The determination unit 14 determines the exposure time such that at least one of the number of feature points and the number of points included in the three-dimensional point group is at least a threshold defined based on either the maximum number of feature points or the maximum number of points included in the three-dimensional point group, and the exposure time is shorter than an exposure time for the maximum number. The determination unit 14 may also determine the exposure time such that the number of points included in the three-dimensional point group is at least the threshold and a reduction rate of the exposure time that is determined with respect to an exposure time for maximizing the number of points included in the three-dimensional point group is larger than a reduction rate of the threshold with respect to the maximum number of points included in the three-dimensional point group. The determination unit 14 may determine the exposure time based on at least one of the number of feature points that are extracted from the plurality of images of the measurement target OB that were captured with different exposure times and the number of points included in the three-dimensional point group that was calculated. Also, the determination unit 14 may determine the exposure time based on the result of estimation made by the estimation unit 13. By the estimation unit 13 estimating how at least one of the number of feature points and the number of points included in the three-dimensional point group changes depending on the exposure time, it is possible to estimate an exposure time with which at least one of the number of feature points and the number of points included in the three-dimensional point group is at least the threshold using a relatively small number of images, and to shorten a time period required for the processing for determining the exposure time.

The determination unit 14 may also determine at least one of the exposure time of the image capturing unit 30 and the light amount of the projecting unit 20 such that at least one of the number of feature points and the number of points included in the three-dimensional point group is at least the threshold and the exposure time is shorter than the exposure time for the maximum number. The determination unit 14 may also determine at least one of the exposure time of the image capturing unit 30 and the light amount of the projecting unit 20 such that the number of points included in the three-dimensional point group is at least the threshold, and either the reduction rate of the exposure time that is determined with respect to the exposure time for maximizing the number of points included in the three-dimensional point group or the reduction rate of the light amount that is determined with respect to the light amount for maximizing the number of points included in the three-dimensional point group is larger than a reduction rate of the threshold with respect to the maximum number of points included in the three-dimensional point group. For example, the determination unit 14 may also determine the light amount of the projecting unit 20 to be as small as possible with a constant exposure time of the image capturing unit 30, such that the number of points included in the three-dimensional point group is at least the threshold, and a reduction rate of the light amount to be determined with respect to the light amount for maximizing the number of points included in the three-dimensional point group is larger than a reduction rate of the threshold with respect to the maximum number of points included in the three-dimensional point group. By determining at least one of the exposure time and the light amount of the projecting unit 20 such that at least one of the number of feature points and the number of points included in the three-dimensional point group is at least the threshold, and the exposure time is shorter than the exposure time for either the maximum number of feature points or the maximum number of points included in the three-dimensional point group, it is possible to attain the advantage of a decrease in the exposure time or the light amount, which is larger than the disadvantage of a decrease in the number of points included in the three-dimensional point group, to capture the measurement target with a light amount that is smaller than a light amount for maximizing the number of points included in the three-dimensional point group, to reduce power consumed by the projecting unit 20, and to measure the three-dimensional shape of the measurement target OB.

The setting unit 15 sets the exposure time of the image capturing unit 30 to the exposure time that was determined by the determination unit 14. The setting unit 15 may also set the light amount of the projecting unit 20 to the light amount that was determined by the determination unit 14. Also, the setting unit 15 may set a pattern of the patterned light that is projected by the projecting unit 20.

Hardware Configuration

Figure 2:
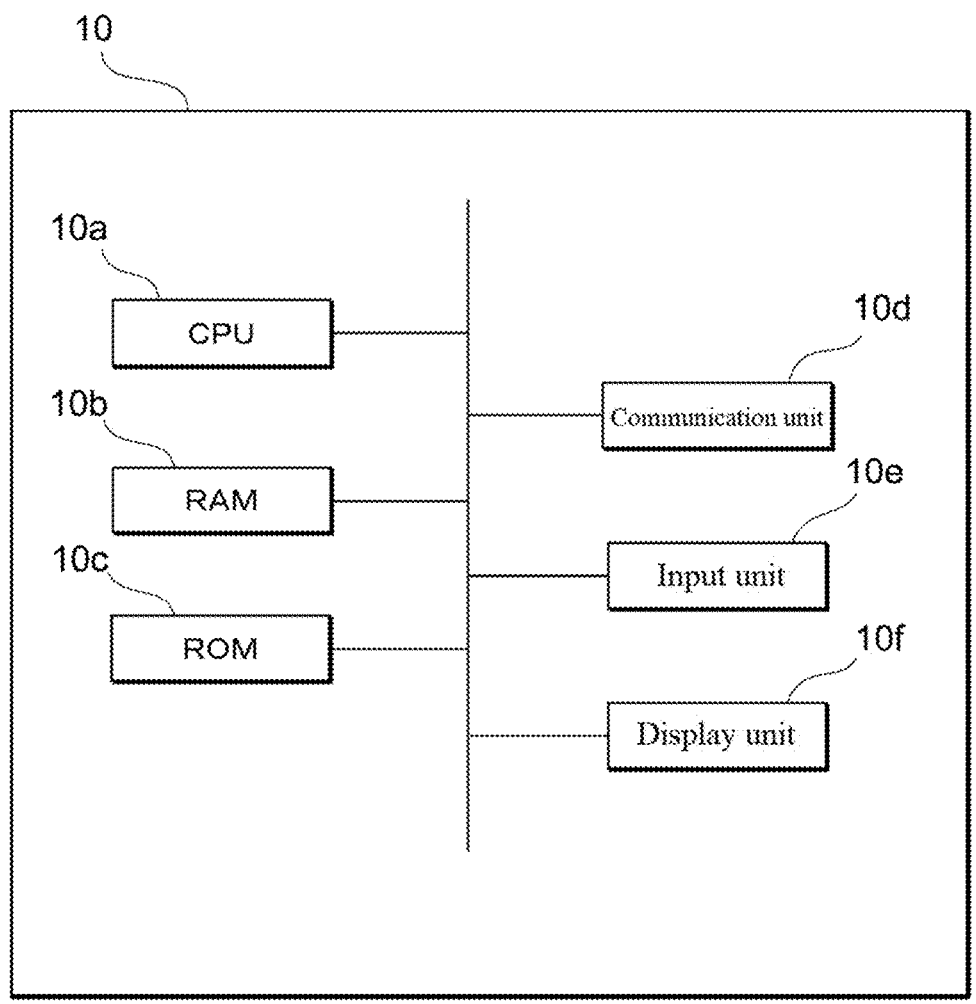
FIG. 2 is a diagram showing a physical configuration of the three-dimensional measurement apparatus according to this embodiment.

Next, an example of the hardware configuration of the arithmetic unit 10 according to the present embodiment will be described with reference to FIG. 2. The arithmetic unit 10 has a CPU (Central Processing Unit) 10a corresponding to a calculating unit, a RAM (Random Access Memory) 10b corresponding to a storage unit, a ROM (Read only Memory) 10c corresponding to a storage unit, a communication unit 10d, an input unit 10e, and a display unit 10f. These elements are connected via a bus so as to be capable of transmitting and receiving data mutually. Although the case where the arithmetic unit 10 is constituted by one computer will be described in this example, the arithmetic unit 10 may also be realized by using a plurality of computers.

The CPU 10a is a control unit configured to perform control related to execution of programs stored in the RAM 10b or the ROM 10c, calculate and process data. The CPU 10a is a calculating unit configured to calculate the positions of the three-dimensional point group expressing the three-dimensional shape of the measurement target OB based on the image of the measurement target OB onto which the patterned light is projected, and execute a program (three-dimensional measurement program) for determining the exposure time of the image capturing unit 30 such that the number of points included in the three-dimensional point group is at least the threshold. The CPU 10a receives various input data from the input unit 10e and the communication unit 10d, displays the result of calculating the input data on the display unit 10f, and stores the input data in the RAM 10b or the ROM 10c.

The RAM 10b is a rewritable storage unit, and may be constituted by a semiconductor memory device, for example. The RAM 10b stores a three-dimensional measurement program executed by the CPU 10a, the image of the measurement target OB that is acquired from the image capturing unit 30, calculated data related to the three-dimensional point group, data such as thresholds, the exposure time of the image capturing unit 30, and the light amount of the projecting unit 20. Note that these are examples, and data other than the above may also be stored in the RAM 10b, and some of this data may not be stored.

The ROM 10c is a data readable storage unit, and may be constituted by a semiconductor memory device, for example. The ROM 10c stores a three-dimensional measurement program and data that is not rewritten, for example.

The communication unit 10d is an interface that connects the arithmetic unit 10 to a communication network. The communication unit 10d may be connected to the projecting unit 20 and the image capturing unit 30 by a LAN (Local Area Network), for example, and may transmit information related to patterned light to the projecting unit 20 and transmit information related to the exposure time to the image capturing unit 30. Also, the communication unit 10d may receive the image of the measurement target OB from the image capturing unit 30. Also, the communication unit 10d may be connected to a communication network such as the Internet.

The input unit 10e receives data input by a user and may also include a keyboard, a mouse, and a touch panel, for example.

The display unit 10f visually displays the result of calculation performed by the CPU 10a, and may also be constituted by an LCD (Liquid Crystal Display), for example. The display unit 10f may also display the image of the measurement target OB captured by the image capturing unit 30, or display a graph showing the relationship between the exposure time and the number of points included in the three-dimensional point group that is calculated, for example.

The three-dimensional measurement program may be provided in a state of being stored in a computer-readable storage medium such as the RAM 10b or the ROM 10c, or may also be provided through a communication network that is connected by the communication unit 10d. In the arithmetic unit 10, various operations that were described with reference to FIG. 1 are realized by the CPU 10a executing the three-dimensional measurement program. Note that these physical configurations are merely examples, and do not necessarily have to be independent from each other. For example, the arithmetic unit 10 may also include an LSI (Large-Scale Integration) chip in which the CPU 10a, the RAM 10b, and the ROM 10c are integrated together.

§ 3 Operation Example

Figure 3:
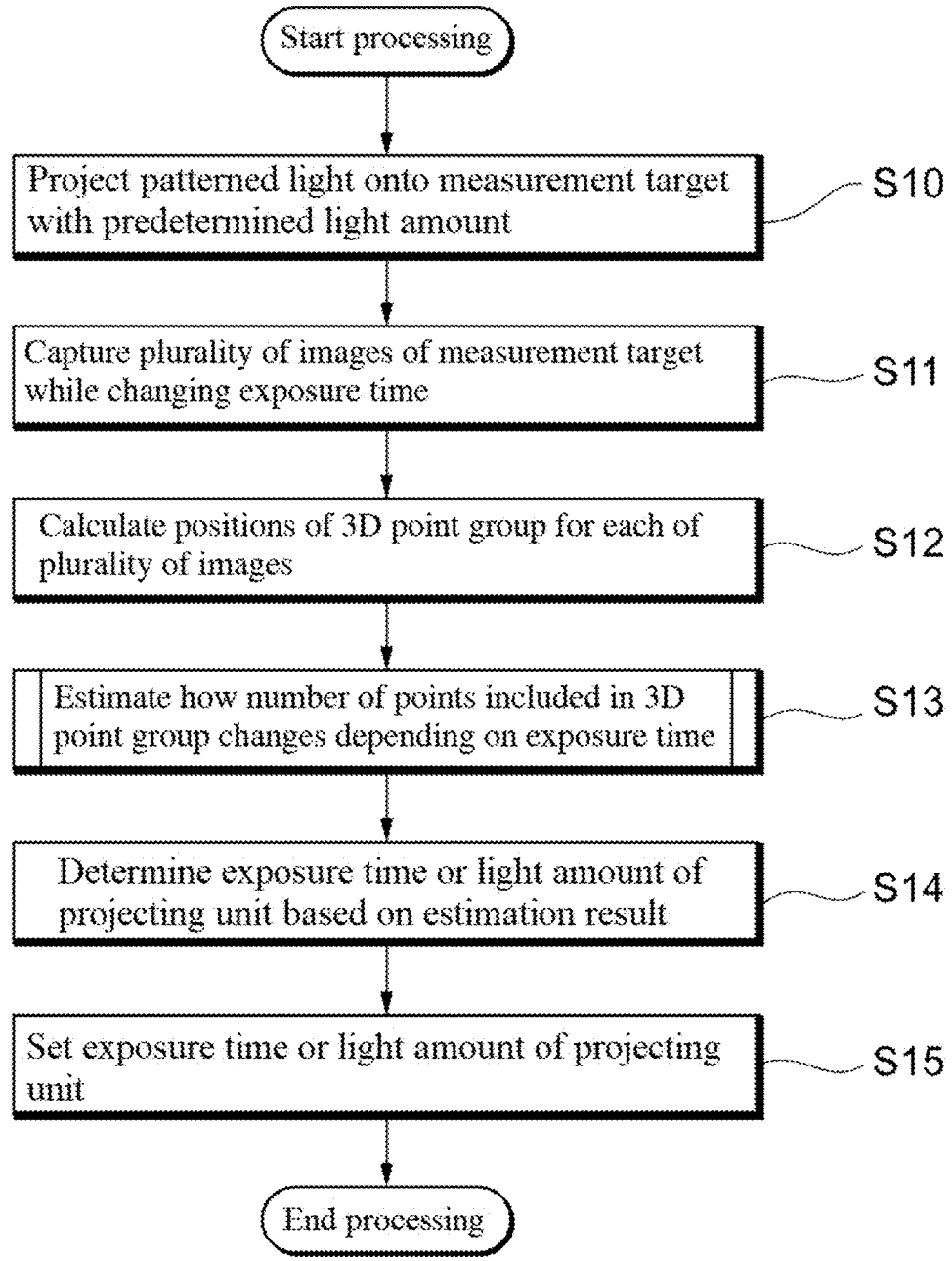
FIG. 3 is a flowchart of determination processing executed by the three-dimensional measurement apparatus according to this embodiment.

FIG. 3 is a flowchart of determination processing executed by the three-dimensional measurement apparatus 100 according to an embodiment. The determination processing is processing for determining the exposure time of the image capturing unit 30 and the light amount of the projecting unit 20. FIG. 3 shows one example of the content of the determination processing.

First, the three-dimensional measurement apparatus 100 projects, using the projecting unit 20, patterned light onto the measurement target OB with a predetermined light amount (step S10). Note that if the determination processing is performed for the first time, the predetermined light amount is predefined, stored in the arithmetic unit 10, and set by the setting unit 15. The image capturing unit 30 then captures a plurality of images of the measurement target OB onto which the patterned light is projected while changing the exposure time (step S11).

Thereafter, the three-dimensional measurement apparatus 100 extracts a plurality of feature points for the plurality of images and calculates positions of a three-dimensional point group based on the plurality of feature points, using the calculation unit 12 of the arithmetic unit 10 (step S12). The estimation unit 13 then estimates how the number of points included in the three-dimensional point group changes depending on the exposure time of the image capturing unit 30 (step S13). Details of the estimation processing (step S13) will be described with reference to the following drawing.

The three-dimensional measurement apparatus 100, using the determination unit 14 of the arithmetic unit 10, determines the exposure time of the image capturing unit 30 or the light amount of the projecting unit 20 based on the result of estimation made by the estimation unit 13 such that the number of points included in the three-dimensional point group is at least the threshold and the exposure time is shorter than the exposure time for the maximum number of points included in the three-dimensional point group (step S14). Note that the three-dimensional measurement apparatus 100 may also determine, using the determination unit 14 of the arithmetic unit 10, the exposure time of the image capturing unit 30 with a constant light amount of the projecting unit 20 based on the result of estimation made by the estimation unit 13 such that the number of points included in the three-dimensional point group is at least the threshold and the exposure time is shorter than the exposure time for the maximum number of points included in the three-dimensional point group.

The three-dimensional measurement apparatus 100 sets, using the setting unit 15 of the arithmetic unit 10, the light amount determined by the determination unit 14 to the projecting unit 20, and sets the exposure time determined by the determination unit 14 to the image capturing unit 30 (step S15). If the exposure time is set shorter due to the result of estimation made by the estimation unit 13, the light amount of the projecting unit 20 may be increased, and if the exposure time is set longer due to the result of estimation made by the estimation unit 13, the light amount of the projecting unit 20 may be reduced. A method for adjusting the light amount may be a method that is used in a general-purpose digital camera, for example. Thus, the determination processing ends.

Figure 4:
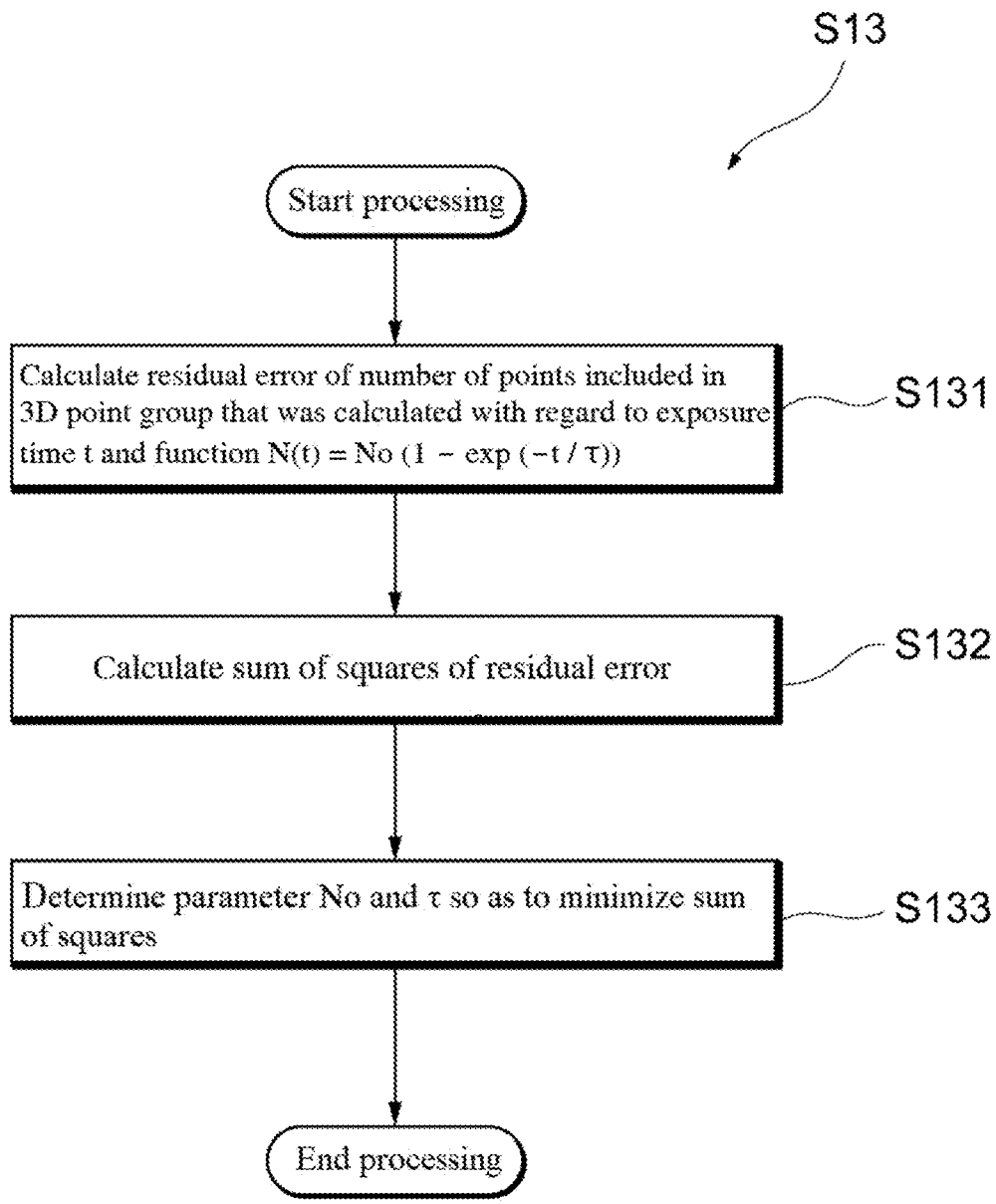
FIG. 4 is a flowchart of estimation processing executed by the three-dimensional measurement apparatus according to this embodiment.

FIG. 4 is a flowchart of estimation processing executed by the three-dimensional measurement apparatus 100 according to the present embodiment. FIG. 4 shows one example of the content of the estimation processing (step S13) performed in the determination processing.

The estimation unit 13 estimates the relationship between the exposure time and the number of points included in the three-dimensional point group, using a function including one or more parameters. More specifically, when the exposure time is t and two parameters are $N_o$ and $\tau$, the estimation unit 13 estimates the relationship between the exposure time and the number of points included in the three-dimensional point group, using the function $N(t)=N_o(1-\exp(-t/\tau))$. If a plurality of images of the measurement target OB are captured for a plurality of exposure times, the relationship between the exposure time and the number of points included in the three-dimensional point group is estimated such that a change in the number of points included in the three-dimensional point group that can be calculated is reproduced by the function $N(t)$. This relationship is estimated by determining the one or more parameters using the least-squares method.

The three-dimensional measurement apparatus 100 calculates a residual error of the number of points included in the three-dimensional point group that was calculated with regard to an exposure time t and the function $N(t)=N_o(1-\exp(-t/\tau))$, using the estimation unit 13 of the arithmetic unit 10 (step S131). That is, when the number of points included in the three-dimensional point group that was calculated by the calculation unit 12 based on the images captured for the exposure time t is expressed as $N_{calc}(t)$, the estimation unit 13 calculates a residual error $(N_{calc}(t)-N(t))$.

Furthermore, the estimation unit 13 calculates the sum of squares of the residual error with regard to a plurality of exposure times $t_1, t_2, \ldots,$ and $t_N$ in which the images were captured by the image capturing unit 30 (step S132). That is, the estimation unit 13 calculates $\Sigma_{t=t1}^{tN} (N_{calc}(t)-N(t))^2$.

The estimation unit 13 then determines the parameter $N_o$ and $\tau$ so as to minimize the sum of squares $\Sigma_{t=t1}^{tN} (N_{calc}(t)-N(t))^2$ (step S133). Note that if a plurality of images of the measurement target were captured with different exposure times, the estimation unit 13 may estimate the parameter $N_o$ such that $N_o=N_{max}$ holds true with respect to the maximum $N_{max}$ of the number of points included in the three-dimensional point group that can be calculated. Thus, the estimation processing ends.

By estimating one or more parameters in this manner, it is possible to accurately estimate how the number of points included in the three-dimensional point group changes depending on the exposure time, to reduce the calculation load of processing for determining the exposure time, and to shorten a time period required for the processing.

Also, by presuming the function $N(t)=N_o(1-\exp(-t/\tau))$ and estimating two parameters $N_o$ and $\tau$, it is possible to accurately estimate a nonlinear relationship between the exposure time and the number of points included in the three-dimensional point group, to reduce the calculation load of processing for determining the exposure time, and to shorten a time period required for the processing.

Note that although an example of processing for estimating how the number of points included in three-dimensional point groups changes depending on the exposure time was described above, it is also possible to presume and execute the same function with regard to processing for estimating how the number of feature points that were extracted from the images changes depending on the exposure time. Specifically, when the number of feature points that are extracted based on an image captured for a given exposure time t is expressed as $n(t)$, it is possible to estimate the relationship between the exposure time and the number of feature points by presuming the function $n(t)=n_o(1-\exp(-t/\tau_o))$ and estimating parameters $n_o$ and $\tau_o$.

Figure 5:
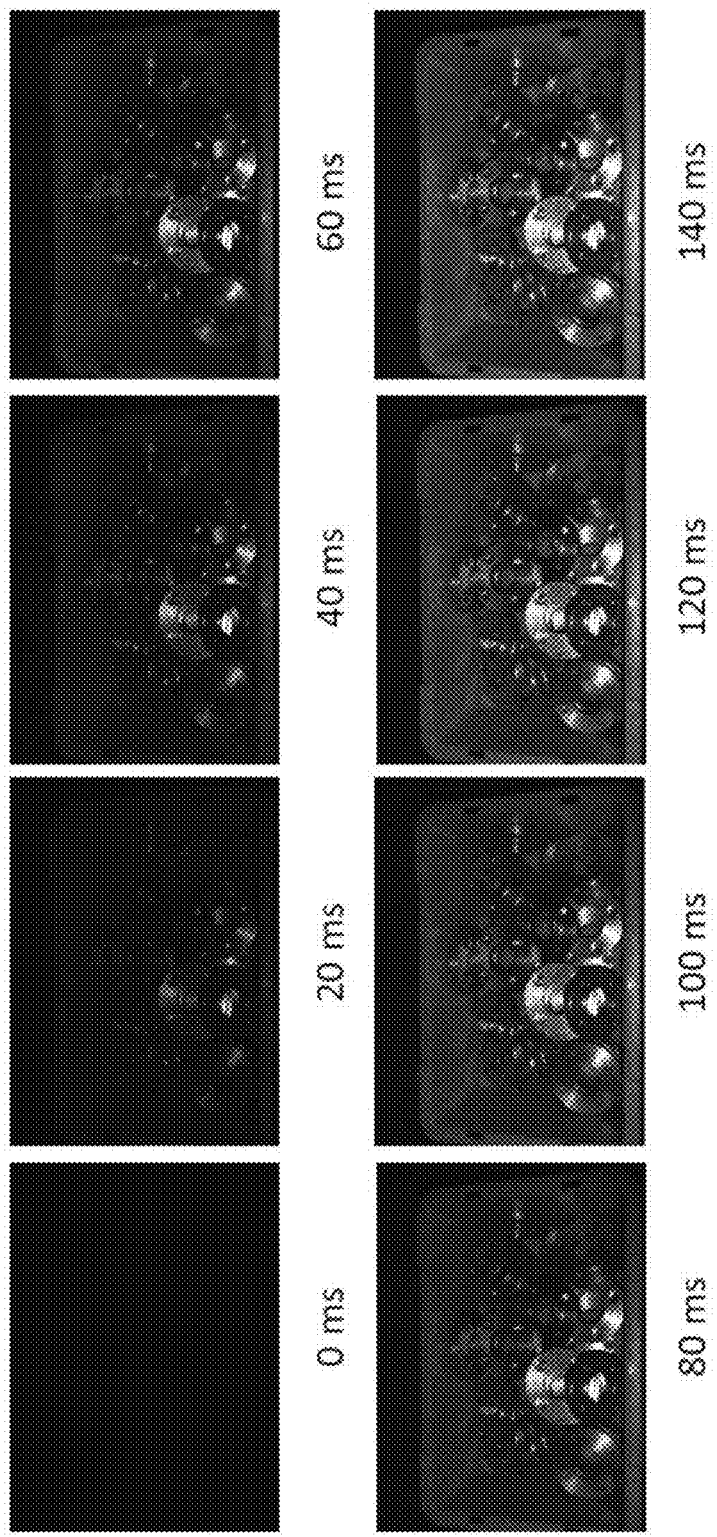
FIG. 5 is an example of a plurality of images of a measurement target captured by the three-dimensional measurement apparatus according to this embodiment.

FIG. 5 is an example of a plurality of images of a measurement target captured by the three-dimensional measurement apparatus 100 according to the present embodiment. FIG. 5 shows the case where eight images are captured by changing the exposure time of the image capturing unit 30 to 0 ms (milliseconds), 20 ms, 40 ms, 60 ms, 80 ms, 100 ms, 120 ms, and 140 ms.

The measurement targets of this example are flanges loaded in bulk. As shown in FIG. 5, as a matter of course, when the exposure time is 0 ms, the measurement targets are not confirmed, when the exposure time is 20 ms, the contours of portions of the plurality of measurement targets are confirmed, and as the exposure time extends from 40 ms to 80 ms, the number of measurement targets whose contours can be confirmed increases. When the exposure time is at least 100 ms, the contours and arrangement of all of the measurement targets can be confirmed.

In general, the image capturing unit 30 sometimes automatically sets the exposure time such that an image has sufficient brightness to an extent that a person can confirm details of the image. From this example, it is found that in order for a person to confirm the contours and arrangement of the measurement targets based on the image, it is necessary to set the exposure time longer than about 100 ms. Thus, a conventional image capturing unit 30 sets the exposure time longer than about 100 ms in some cases. Actually, when the exposure time of a general-purpose camera was automatically set under the same lighting conditions as this example, the exposure time was 160 ms.

Figure 6:
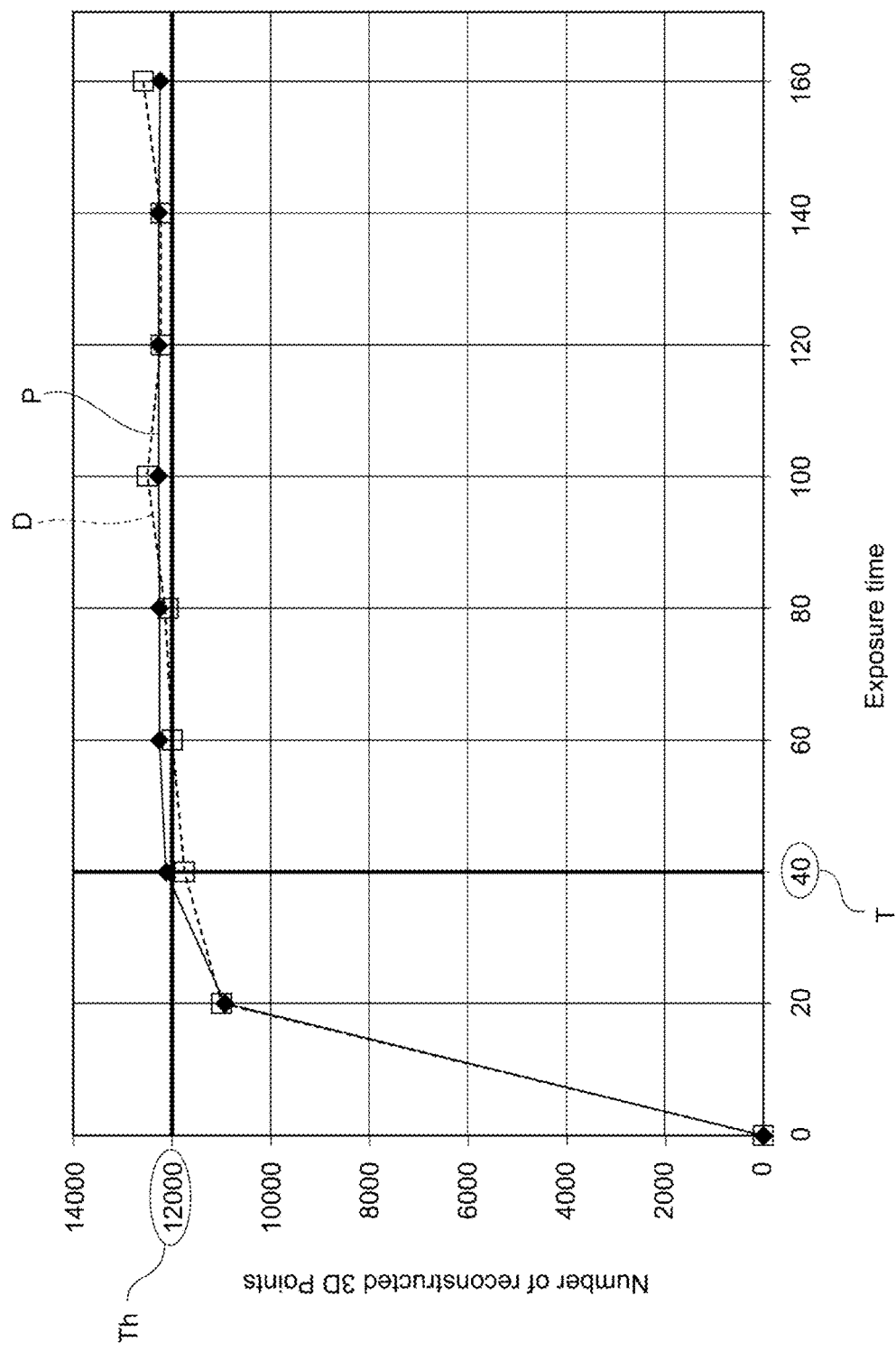
FIG. 6 is an example showing a relationship between an exposure time estimated by the three-dimensional measurement apparatus according to this embodiment and the number of points included in the three-dimensional point group.

FIG. 6 is an example showing the relationship between the exposure time estimated by the three-dimensional measurement apparatus 100 according to the present embodiment and the number of points included in the three-dimensional point group. In FIG. 6, a horizontal axis indicates the exposure time (Exposure time (ms)) of the image capturing unit 30 in units of milliseconds, and a vertical axis indicates the number of three-dimensional point groups (Number of reconstructed 3D Points) calculated by the calculation unit 12. FIG. 6 shows the relationship between the exposure time and the number of points included in the three-dimensional point group using a solid line, the exposure time being estimated by the estimation unit 13 based on the eight images shown in FIG. 5 and the image captured for an exposure time of 160 ms. Also, FIG. 6 shows, using a broken line, the relationship between the exposure time and the number of three-dimensional point groups calculated by the calculation unit 12 based on the eight images shown in FIG. 5 and the image captured for an exposure time of 160 ms.

More specifically, a graph D represented by a broken line in FIG. 6 is obtained by connecting, using a straight line, the number $N_{calc}(t_1)$ of three-dimensional point groups calculated when exposure time $t_1$ is equal to 0 ms, the number $N_{calc}(t_2)$ of three-dimensional point groups calculated when exposure time $t_2$ is equal to 20 ms, the number $N_{calc}(t_3)$ of three-dimensional point groups calculated when exposure time $t_3$ is equal to 40 ms, the number $N_{calc}(t_4)$ of three-dimensional point groups calculated when exposure time $t_4$ is equal to 60 ms, the number $N_{calc}(t_5)$ of three-dimensional point groups calculated when exposure time $t_5$ is equal to 80 ms, the number $N_{calc}(t_6)$ of three-dimensional point groups calculated when exposure time $t_6$ is equal to 100 ms, the number $N_{calc}(t_7)$ of three-dimensional point groups calculated when exposure time $t_7$ is equal to 120 ms, the number $N_{calc}(t_8)$ of three-dimensional point groups calculated when exposure time $t_8$ is equal to 140 ms, and the number $N_{calc}(t_9)$ of three-dimensional point groups calculated when exposure time $t_9$ is equal to 160 ms. Here, when exposure time t9 is equal to 160 ms, the number $N_{calc}(t_9)$ of three-dimensional point groups calculated is at its maximum.

Also, a graph P represented by a solid line in FIG. 6 is obtained by connecting, using a straight line, the number $N(t_1)$ of three-dimensional point groups estimated when exposure time $t_1$ is equal to 0 ins, the number $N(t_2)$ of three-dimensional point groups estimated when exposure time $t_2$ is equal to 20 ms, the number $N(t_3)$ of three-dimensional point groups estimated when exposure time $t_3$ is equal to 40 ms, the number $N(t_4)$ of three-dimensional point groups estimated when exposure time $t_4$ is equal to 60 ms, the number $N(t_5)$ of three-dimensional point groups estimated when exposure time $t_5$ is equal to 80 ms, the number $N(t_6)$ of three-dimensional point groups estimated when exposure time $t_6$ is equal to 100 ms, the number $N(t_7)$ of three-dimensional point groups estimated when exposure time $t_7$ is equal to 120 ms, the number $N(t_8)$ of three-dimensional point groups estimated when exposure time $t_8$ is equal to 140 ms, and the number $N(t_9)$ of three-dimensional point groups estimated when exposure time $t_9$ is equal to 160 ms.

Also, the vertical axis of FIG. 6 indicates a threshold Th. In this example the threshold Th is 12000. The horizontal axis of FIG. 6 indicates an exposure time T determined by the determination unit 14. In this example, the exposure time T determined by the determination unit 14 is 40 ms. In this example, the determination unit 14 determines the exposure time T by the minimum exposure time with which the graph P estimated by the estimation unit 13 is at least the threshold Th.

Herein, when the threshold Th is expressed by a ratio A to the maximum $N_{max}(=N_{calc}(t_9))$ of the number of points included in the three-dimensional point group, the threshold Th in this example corresponds to A=0.99 holding true. That is, if a plurality of images of the measurement targets are captured with different exposure times, the threshold Th in this example is set to 99% of the maximum $N_{max}$ of the number of points included in the three-dimensional point group that can be calculated. Herein, a reduction rate of the threshold Th with respect to the maximum $N_{max}$ of the number of points included in the three-dimensional point group is 1%. At this time, the determination unit 14 may determine the exposure time such that the reduction rate of the exposure time T to be determined with respect to the exposure time $t_9$ with which the number of points included in the three-dimensional point group is at its maximum $N_{max}$ is larger than the reduction rate of the threshold Th with respect to the maximum $N_{max}$. In this example, the determination unit 14 determines the exposure time such that the reduction rate of the exposure time T (40 ms) to be determined with respect to the exposure time $t_9$ (160 ms) with which the number of points included in the three-dimensional point group is at its maximum $N_{max}$ is 75%. Also, the determination unit 14 may determine the exposure time using T=τ ln(1/(1−A)). In this example, because A=0.99 holds true, the determination unit 14 may determine the exposure time using T≈4.6τ. Accordingly, by estimating the parameter τ, it is possible to calculate, using a simple calculation, the exposure time T with which the number of points included in the three-dimensional point group coincides with the threshold Th, to reduce the calculation load of processing for determining the exposure time, and to shorten a time period required for the processing.

Figure 7:
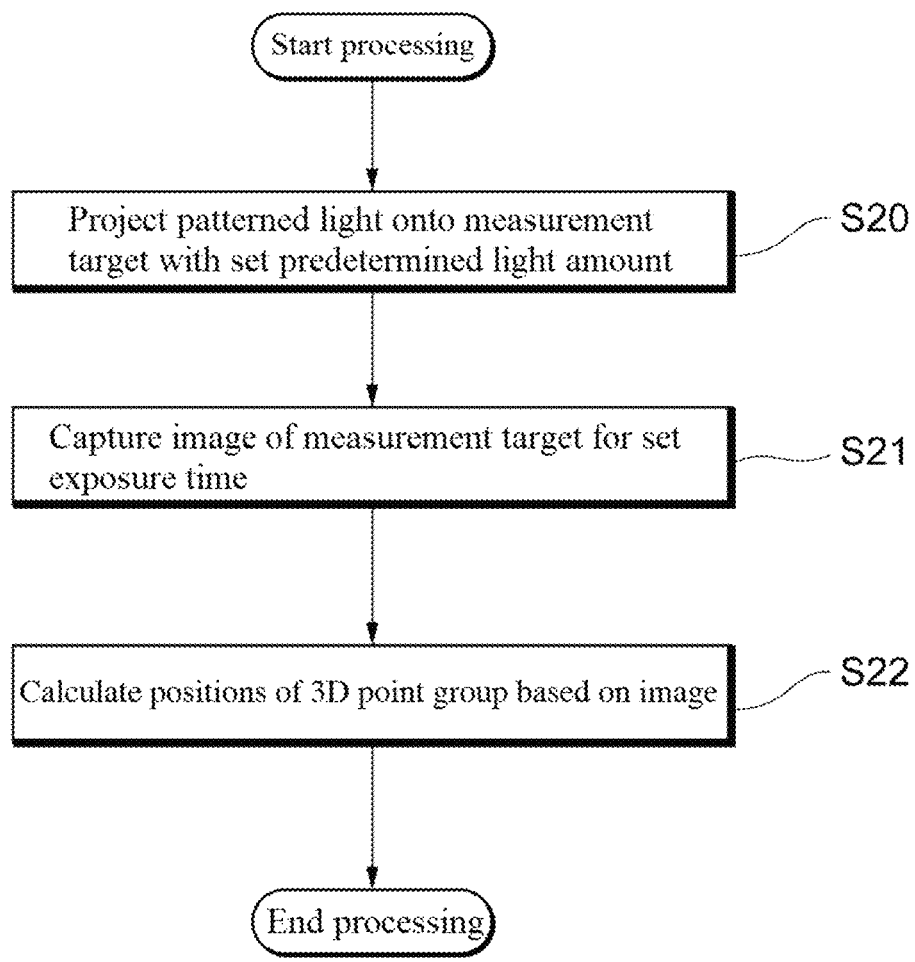
FIG. 7 is a flowchart of three-dimensional measurement processing executed by the three-dimensional measurement apparatus according to this embodiment.

FIG. 7 is a flowchart of three-dimensional measurement processing executed by the three-dimensional measurement apparatus 100 according to the present embodiment. The three-dimensional measurement processing is processing in which an image of the measurement target OB is captured for the exposure time or the light amount that is determined by the determination unit 14 and set by the setting unit 15, and positions of a three-dimensional point group expressing a three-dimensional shape of the measurement target OB are calculated based on the image.

First, the three-dimensional measurement apparatus 100 projects, using the projecting unit 20, patterned light onto the measurement target OB at a light amount set by the setting unit 15 (step S20). Note that the light amount of the projecting unit 20 is not necessarily determined by the determination unit 14, and the light amount of the projecting unit 20 that is set by the setting unit 15 may also be constant. The image capturing unit 30 then captures an image of the measurement target OB onto which the patterned light is projected, for the exposure time set by the setting unit 15 (step S21). Herein, the image capturing unit 30 should capture one image of the measurement target OB.

Thereafter, the three-dimensional measurement apparatus 100 extracts a plurality of feature points included in the captured image and calculates positions of a three-dimensional point group based on the plurality of feature points, using the calculation unit 12 of the arithmetic unit 10 (step S22). Thus, the three-dimensional measurement processing ends.

In this example, the image capturing unit 30 stops capturing the image in 40 ms, which is the exposure time determined by the determination unit 14. The arithmetic unit 10 then acquires the image from the image capturing unit 30 in approximately 130 ms using the acquisition unit 11, and can calculate the positions of the three-dimensional point group using the calculation unit 12. Thus, the three-dimensional measurement apparatus 100 according to the present embodiment can perform three-dimensional measurement processing in approximately 170 ms. If an exposure time that was automatically set based on human visibility is adopted, the exposure time is 160 ms, and thus, if a time period required for the acquisition unit 11 to acquire the image and the calculation unit 12 to calculate the positions of the three-dimensional point group is approximately 130 ms, then it takes 290 ms to perform the three-dimensional measurement processing. Thus, the three-dimensional measurement apparatus 100 according to the present embodiment makes it possible to shorten the time period required for the three-dimensional measurement processing to approximately half. On the other hand, the number of points included in the three-dimensional point group that can be calculated only decreases by 1%.

Figure 8:
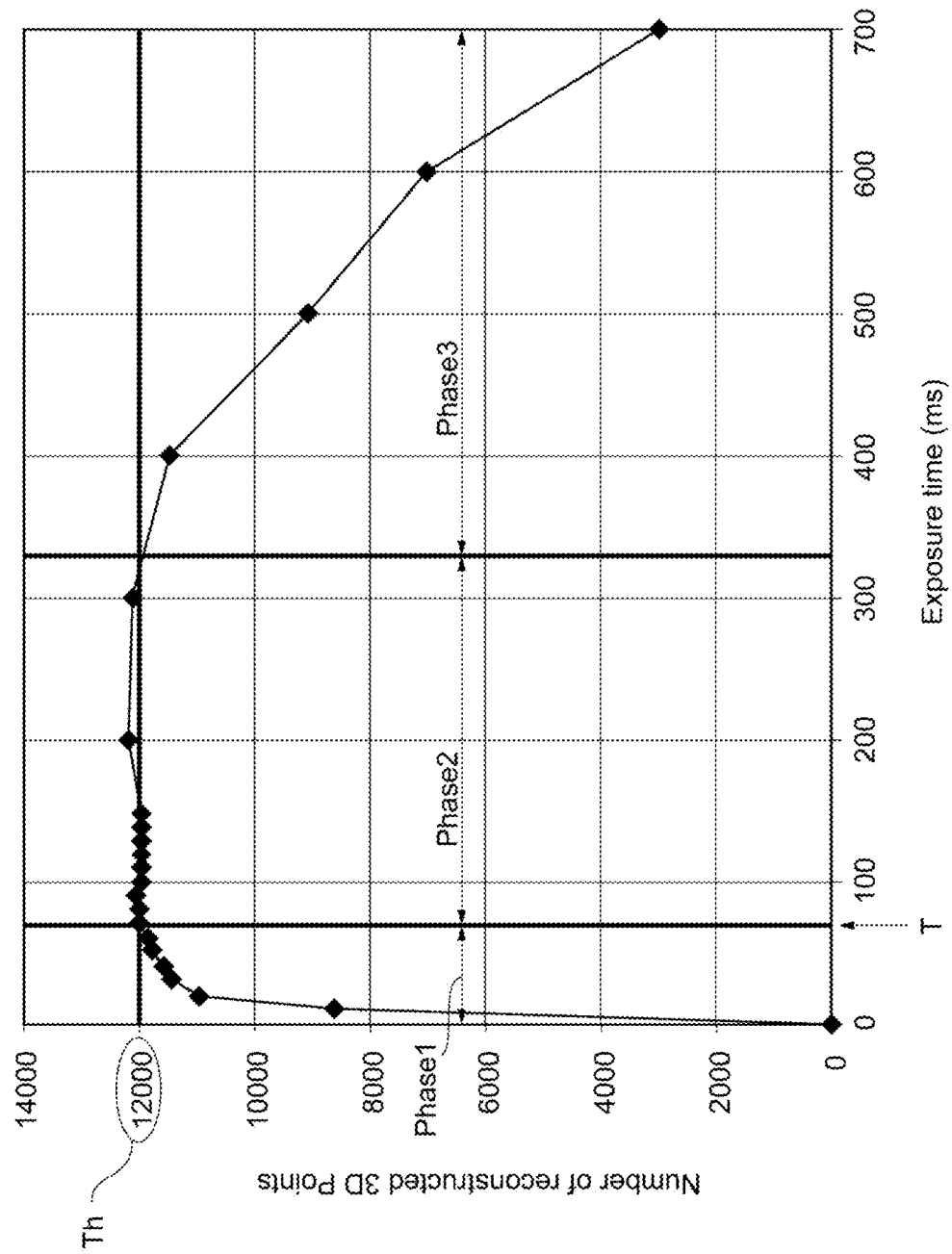
FIG. 8 is an example showing a relationship between an exposure time and the number of points included in the three-dimensional point group measured by the three-dimensional measurement apparatus according to this embodiment.

FIG. 8 is an example showing the relationship between the exposure time and the number of points included in the three-dimensional point group estimated by the three-dimensional measurement apparatus 100 according to the present embodiment. In FIG. 8, a horizontal axis indicates the exposure time (Exposure time (ms)) of the image capturing unit 30 in units of milliseconds, and a vertical axis indicates the number of three-dimensional point groups (Number of reconstructed 3D Points) calculated by the calculation unit 12. In FIG. 8, the exposure time is changed in increments of 10 ms from 0 ms to 150 ms, and changed in increments of 100 ms from 200 ms to 700 ms, a plurality of images of the measurement target are captured, the positions of the three-dimensional point group for each image are calculated by the calculation unit 12, and the number of points included in the calculated three-dimensional point group is plotted. Also, FIG. 8 shows three stages (phase 1, phase 2, and phase 3) that appear in the result that the estimation unit 13 estimates the relationship between the exposure time and the number of points included in the three-dimensional point group.

The result of estimation made by the estimation unit 13 includes the first stage (phase 1) in which the number of points included in the three-dimensional point group increases as the exposure time extends, and the second stage (phase 2) that is adjacent to the first stage and in which the number of points included in the three-dimensional point group changes more gently than in the first stage, and the number of three-dimensional point groups is at least the threshold Th. In this example, the threshold Th is 12000, and according to FIG. 8, it can be seen that the number of points included in the three-dimensional point group that can be calculated is at least the threshold Th in the second stage of the estimation result. Also, it is confirmed that the number of points included in the three-dimensional point group exponentially increases as the exposure time extends in the first stage, and the number of three-dimensional point groups slightly increases with almost no change from the threshold Th in the second stage.

The determination unit 14 may determine the exposure time T based on the boundary between the first stage (phase 1) and the second stage (phase 2). In this example, the determination unit 14 determines the exposure time T such that it coincides with the boundary between the first stage (phase 1) and the second stage (phase 2). By determining the exposure time based on the boundary between the first stage and the second stage in this manner, it is possible to minimize the exposure time with which the number of points included in the three-dimensional point group is at least the threshold, to shorten the exposure time of the image capturing unit 30, and to measure the three-dimensional shape of the measurement target.

The result of estimation made by the estimation unit 13 further includes the third stage (phase 3) that is adjacent to the second stage (phase 2) and in which the number of points included in the three-dimensional point group decreases as the exposure time extends. Note that another stage may also be included between the second stage and the third stage, relatively small one or more peaks appear with respect to the number of points included in the three-dimensional point group, and in this case, a stage in which the number of points included in the three-dimensional point group monotonically decreases may be defined as the third stage. According to FIG. 8, it can be seen that the number of points included in the three-dimensional point group that can be calculated is not more than the threshold Th in the third stage of the estimation result. Also, it is confirmed that in the third stage, the number of points included in the three-dimensional point group roughly parabolically decreases as the exposure time extends.

Also, the absolute value of an amount of change in the number of points included in the three-dimensional point group when the exposure time is changed by a predetermined amount is smaller in the second stage than in the third stage. It can be seen that, for example, if the exposure time is increased by 100 ms, the number of points included in the three-dimensional point group slightly increases in the second stage, but the number of points included in the three-dimensional point group decreases by about 2000 in the third stage. This can also be said that the absolute value of a slope of the relationship between the exposure time and the number of points included in the three-dimensional point group is smaller in the second stage than in the third stage.

If the exposure time is changed by a predetermined amount, the absolute value of the amount of a change in the number of points included in the three-dimensional point group is smaller in the second stage than in the third stage, and thus even if the exposure time is changed in the second stage, a change in the number of points included in the three-dimensional point group is relatively small. Thus, it is possible to set a threshold such that a difference between the threshold and the maximum number of points included in the three-dimensional point group is relatively small, and to further shorten the exposure time while sufficiently increasing the number of points included in the three-dimensional point group.

Note that although an example of the result of estimating how the number of three-dimensional point groups changes depending on the exposure time was described above, the result of estimating how the number of feature points that were extracted from the image changes depending on the exposure time similarly includes the first stage, the second stage, and the third stage.

§ 4 Modifications 4.1

Figure 9:
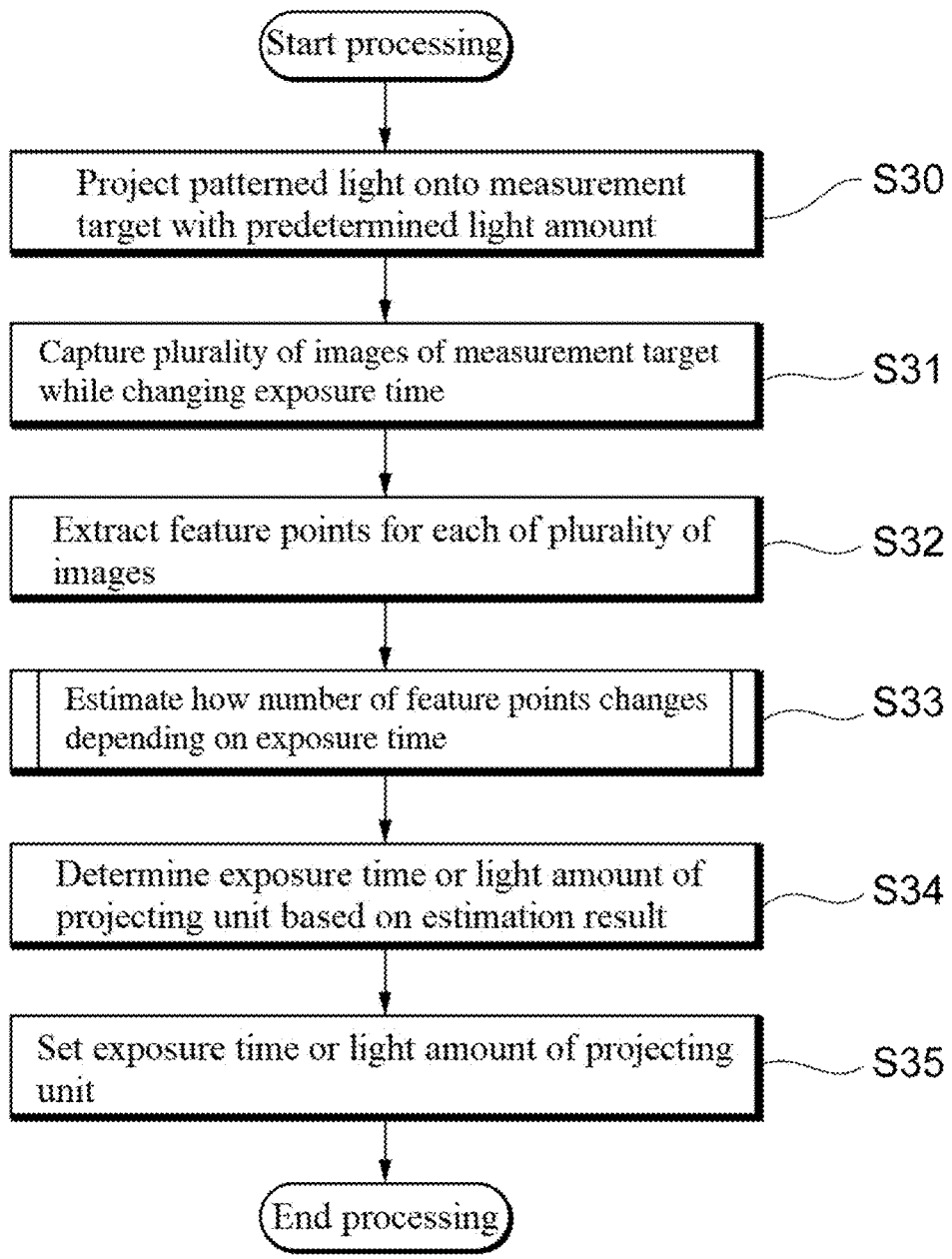
FIG. 9 is a flowchart of determination processing executed by the three-dimensional measurement apparatus according to a modification.

FIG. 9 is a flowchart of determination processing executed by the three-dimensional measurement apparatus 100 according to a modification in the present embodiment. The three-dimensional measurement apparatus 100 according to the present modification is different from the three-dimensional measurement apparatus according to the present embodiment in that in order to determine the exposure time of the image capturing unit 30, the number of feature points that are extracted to calculate the positions of the three-dimensional point group, instead of the number of points included in the three-dimensional point group. That is, the three-dimensional measurement apparatus 100 according to the present modification extracts, using the calculation unit 12, a plurality of feature points included in the image captured by the image capturing unit 30, calculates the positions of the three-dimensional point group based on the plurality of feature points, and determines, using the determination unit 14, the exposure time such that the number of feature points is at least a threshold defined based on the maximum number of feature points, and the exposure time is shorter than an exposure time for the maximum number. With regard to other configurations, the three-dimensional measurement apparatus 100 according to this modification has a configuration that is similar to that of the three-dimensional measurement apparatus according to the present embodiment.

Herein, the threshold that is defined based on the maximum number of feature points may be different from or the same value as a threshold defined based on the maximum number of three-dimensional point groups. The threshold that is defined based on the maximum number of feature points may be a threshold used by the three-dimensional measurement apparatus 100 according to the present modification, or may also be at least the threshold defined based on the maximum number of three-dimensional point groups.

First, the three-dimensional measurement apparatus 100 projects, using the projecting unit 20, patterned light onto the measurement target OB with a predetermined light amount (step S30). Note that if the determination processing is performed for the first time, the predetermined light amount is predefined, stored in the arithmetic unit 10, and set by the setting unit 15. The image capturing unit 30 then captures a plurality of images of the measurement target OB onto which the patterned light is projected while changing the exposure time (step S31).

Thereafter, the three-dimensional measurement apparatus 100 extracts feature points for the plurality of images using the calculation unit 12 of the arithmetic unit 10 (step S32). The estimation unit 13 then estimates how the number of points included in the three-dimensional point group changes depending on the exposure time of the image capturing unit 30 (step S33). Details of the estimation processing (step S33) will be similar to those shown in FIG. 4. That is, when the number of feature points that are extracted based on an image captured for a given exposure time t is expressed as n(t), the estimation unit 13 may estimate the relationship between the exposure time and the number of feature points by presuming the function $n(t) = n_o(1-\exp(-t/\tau_o))$ and estimating parameters $n_o$ and $\tau_o$.

The three-dimensional measurement apparatus 100 determines, using the determination unit 14 of the arithmetic unit 10, based on the result of estimation made by the estimation unit 13, the exposure time of the image capturing unit 30 or the light amount of the projecting unit 20 such that the number of feature points that can be extracted is at least a threshold, and the exposure time is shorter than an exposure time for the maximum number of feature points that can be extracted (step S34). Note that the three-dimensional measurement apparatus 100 may also determine, using the determination unit 14 of the arithmetic unit 10, based on the result of estimation made by the estimation unit 13, the exposure time of the image capturing unit 30 with a constant light amount of the projecting unit 20 such that the number of feature points that can be extracted is at least a threshold, and the exposure time is shorter than an exposure time for the maximum number of feature points that can be extracted.

The three-dimensional measurement apparatus 100 sets, using the setting unit 15 of the arithmetic unit 10, the light amount determined by the determination unit 14 to the projecting unit 20, or sets the exposure time determined by the determination unit 14 to the image capturing unit 30 (step S35). If the exposure time is set shorter due to the result of estimation made by the estimation unit 13, the light amount of the projecting unit 20 may be increased, and if the exposure time is set longer due to the result of estimation made by the estimation unit 13, the light amount of the projecting unit 20 may be reduced. A method for adjusting the light amount may be a method that is used in a general-purpose digital camera, for example. Thus, the determination processing ends.

The three-dimensional measurement apparatus 100 according to the present modification makes it possible to attain the advantage of a decrease in the exposure time, which is larger than the disadvantage of a decrease in the number of feature points that can be extracted, by determining the exposure time such that the number of feature points that can be extracted in order to calculate the positions of the three-dimensional point group is at least the threshold and the exposure time is shorter than an exposure time for the maximum number of feature points that can be extracted, to omit the processing for calculating the positions of the three-dimensional point group in the determination processing, to reduce the calculation load more than in the case where the exposure time is determined such that the number of points included in the three-dimensional point group is at least the threshold, and to shorten a time period required for the processing for determining the exposure time.

The above-described embodiment is for facilitating understanding of the present invention and are not intended to limit the interpretation of the present invention. Elements included in the embodiment and their arrangement, materials, conditions, shapes, size, and the like are not limited to the examples and can be changed as appropriate. Also, it is possible to partially replace or combine configurations described in different embodiments.

Additional Remark 1

A three-dimensional measurement apparatus (100) including:

a projecting unit (20) configured to project patterned light onto a measurement target;

an image capturing unit (30) configured to capture an image of the measurement target onto which the patterned light is projected, with a predetermined exposure time;

a calculation unit (12) configured to extract a plurality of feature points included in the image and to calculate positions of a three-dimensional point group expressing a three-dimensional shape of the measurement target based on the plurality of feature points; and a determination unit (14) configured to determine the exposure time such that at least one of the number of feature points and the number of points included in the three-dimensional point group is at least a threshold that is defined based on either the maximum number of feature points or the maximum number of points included in the three-dimensional point group, and the exposure time is shorter than an exposure time for the maximum number.

Additional Remark 2

The three-dimensional measurement apparatus (100) according to Additional Remark 1, in which the image capturing unit (30) is configured to capture a plurality of the images while changing the exposure time, the apparatus (100) further including an estimation unit (13) configured to estimate, based on the plurality of images, how at least one of the number of feature points and the number of points included in the three-dimensional point group changes depending on the exposure time, and the determination unit (14) is configured to determine the exposure time based on a result of estimation made by the estimation unit (13).

Additional Remark 3

The three-dimensional measurement apparatus (100) according to Additional Remark 2, in which the estimation result includes:

a first stage in which the number of feature points and the number of points included in the three-dimensional point group increase as the exposure time extends, and a second stage that is adjacent to the first stage and in which the number of feature points and the number of points included in the three-dimensional point group increase more gently than in the first stage as the exposure time extends, and at least one of the number of feature points and the number of three-dimensional point groups is at least the threshold, and the determination unit (14) is configured to determine the exposure time based on a boundary between the first stage and the second stage.

Additional Remark 4

The three-dimensional measurement apparatus (100) according to Additional Remark 3, in which the estimation result further includes a third stage that is adjacent to the second stage and in which the number of feature points and the number of points included in the three-dimensional point group decrease as the exposure time extends, and an absolute value of an amount of a change in the number of feature points and an absolute value of an amount of a change in the number of points included in the three-dimensional point group when the exposure time is changed by a predetermined amount are smaller in the second stage than in the third stage.

Additional Remark 5

The three-dimensional measurement apparatus (100) according to Additional Remark 3 or 4, in which the estimation unit (13) is configured to estimate relationships between the exposure time in the first stage and the exposure time in the second stage, the number of feature points, and the number of points included in the three-dimensional point group, using a function including one or more parameters.

Additional Remark 6

The three-dimensional measurement apparatus (100) according to Additional Remark 5, in which, when the exposure time is t and the one or more parameters are $N_o$ and $\tau$, the estimation unit (13) estimates the relationships between the exposure time in the first stage and the exposure time in the second stage, the number of feature points, and the number of points included in the three-dimensional point group, using the function $N(t)=N_o(1-\exp(-t/\tau))$.

Additional Remark 7

The three-dimensional measurement apparatus (100) according to Additional Remark 6, in which, when the threshold is expressed as A and is greater than zero and not more than one, the determination unit (14) determines the exposure time t using $t=\tau \ln(1/(1-A))$.

Additional Remark 8

The three-dimensional measurement apparatus (100) according to any one of Additional Remarks 1 to 7, in which the determination unit (14) is configured to determine the exposure time or a light amount of the projecting unit (20) such that at least one of the number of feature points and the number of points included in the three-dimensional point group is at least the threshold, and the exposure time is shorter than an exposure time for the maximum number.

Additional Remark 9

A three-dimensional measurement method including:
projecting patterned light onto a measurement target;
capturing an image of the measurement target onto which the patterned light is projected, with a predetermined exposure time;
extracting a plurality of feature points included in the image and calculating positions of a three-dimensional point group expressing a three-dimensional shape of the measurement target based on the plurality of feature points; and
determining the exposure time such that at least one of the number of feature points and the number of points included in the three-dimensional point group is at least a threshold that is defined based on either the maximum number of feature points or the maximum number of points included in the three-dimensional point group, and the exposure time is shorter than an exposure time for the maximum number.

Additional Remark 10

A three-dimensional measurement program causing an arithmetic unit (10) provided in a three-dimensional measurement apparatus (100) including a projecting unit (20) configured to project patterned light onto a measurement target and an image capturing unit (30) configured to capture an image of the measurement target onto which the patterned light is projected, with a predetermined exposure time, to operate as a calculation unit (12) configured to extract a plurality of feature points included in the image and to calculate positions of a three-dimensional point group expressing a three-dimensional shape of the measurement target based on the plurality of feature points, and a determination unit (14) configured to determine the exposure time such that at least one of the number of feature points and the number of points included in the three-dimensional point group is at least a threshold that is defined based on either the maximum number of feature points or the maximum number of points included in the three-dimensional point group, and the exposure time is shorter than an exposure time for the maximum number.

The invention claimed is:

1. A three-dimensional measurement apparatus, comprising:
a projector configured to project a patterned light onto a measurement target;
a camera configured to capture an image of the measurement target onto which the patterned light is projected, with an exposure time which is predetermined; and
a processor configured to:
extract a plurality of feature points included in the image and to calculate positions of a three-dimensional point group expressing a three-dimensional shape of the measurement target based on the plurality of feature points, and
determine the exposure time such that at least one of a number of the plurality of feature points and a number of points included in the three-dimensional point group is at least a threshold that is defined based on either a maximum number of the plurality of feature points or a maximum number of points included in the three-dimensional point group, and the exposure time is shorter than an exposure time for the maximum number.

2. The three-dimensional measurement apparatus according to claim 1,
wherein the camera is configured to capture a plurality of the images while changing the exposure time,
the processor is further configured to estimate, based on the plurality of images, how at least one of a number of the plurality of feature points and a number of points included in the three-dimensional point group changes depending on the exposure time, and
to determine the exposure time based on an estimation result made by the processor.

3. The three-dimensional measurement apparatus according to claim 2,
wherein the estimation result includes:
a first stage in which the number of the plurality of feature points and the number of points included in the three-dimensional point group increase as the exposure time extends, and
a second stage that is adjacent to the first stage and in which the number of the plurality of feature points and the number of points included in the three-dimensional point group change more gently than in the first stage as the exposure time extends, and at least one of the number of the plurality of feature points and the number of three-dimensional point groups is equal to or greater than the threshold, and
the processor is configured to determine the exposure time based on a boundary between the first stage and the second stage.

4. The three-dimensional measurement apparatus according to claim 3,
wherein the estimation result further includes a third stage that is adjacent to the second stage and in which the number of the plurality of feature points and the number of points included in the three-dimensional point group decrease as the exposure time extends, and
an absolute value of an amount of a change in the number of the plurality of feature points and an absolute value of an amount of a change in the number of points included in the three-dimensional point group when the exposure time is changed by a predetermined amount are smaller in the second stage than in the third stage.

5. The three-dimensional measurement apparatus according to claim 3,
wherein the processor is configured to estimate relationships between the exposure time in the first stage and the exposure time in the second stage, the number of the plurality of feature points, and the number of points included in the three-dimensional point group, using a function including one or more parameters.

6. The three-dimensional measurement apparatus) according to claim 5,
wherein, when the exposure time is t and the one or more parameters are $N_o$ and $\tau$, the processor estimates the relationships between the exposure time in the first stage and the exposure time in the second stage, the number of the plurality of feature points, and the number of points included in the three-dimensional point group, using the function $N(t)=N_o(1-\exp(-t/\tau))$.

7. The three-dimensional measurement apparatus according to claim 6,
wherein, when the threshold is expressed as A and is greater than zero and not more than one,
the processor determines the exposure time t using $t=\tau \ln(1/(1-A))$.

8. The three-dimensional measurement apparatus according to claim 1,
wherein the processor is configured to determine the exposure time or a light amount of the projector such that at least one of a number of the plurality of feature points and a number of points included in the three-dimensional point group is equal to or greater than the threshold, and the exposure time is shorter than an exposure time for the maximum number.

9. A three-dimensional measurement method, comprising:
projecting a patterned light onto a measurement target;
capturing an image of the measurement target onto which the patterned light is projected, with an exposure time which is predetermined;
extracting a plurality of feature points included in the image and calculating positions of a three-dimensional point group expressing a three-dimensional shape of the measurement target based on the plurality of feature points; and
determining the exposure time such that at least one of a number of the plurality of feature points and a number of points included in the three-dimensional point group is at least a threshold that is defined based on either a maximum number of the plurality of feature points or a maximum number of points included in the three-dimensional point group, and the exposure time is shorter than an exposure time for the maximum number.

10. A three-dimensional measurement non-transitory computer readable medium, storing a program causing a processor provided in a three-dimensional measurement apparatus including a projector configured to project a patterned light onto a measurement target and a camera configured to capture an image of the measurement target onto which the patterned light is projected, with an exposure time which is predetermined, to execute operations of:
extracting a plurality of feature points included in the image and to calculate positions of a three-dimensional point group expressing a three-dimensional shape of the measurement target based on the plurality of feature points, and
determining the exposure time such that at least one of a number of the plurality of feature points and a number of points included in the three-dimensional point group is equal to or greater than a threshold that is defined based on either a maximum number of the plurality of feature points or a maximum number of points included in the three-dimensional point group, and the exposure time is shorter than an exposure time for the maximum number.

* * * * *